(12) United States Patent
Kipnis et al.

(10) Patent No.: US 8,681,811 B2
(45) Date of Patent: Mar. 25, 2014

(54) SYSTEM AND METHOD FOR OBTAINING CROSS COMPATIBILITY WITH A PLURALITY OF THIN-CLIENT PLATFORMS

(75) Inventors: Sergey Kipnis, Pleinfeld (DE); Klaus A. Maier, Pleinfeld (DE); Gabriele Sartori, Fremont, CA (US)

(73) Assignee: nComputing Inc., Santa Clara, CA (US)

( * ) Notice: Subject to any disclaimer, the term of this patent is extended or adjusted under 35 U.S.C. 154(b) by 597 days.

(21) Appl. No.: 12/360,400

(22) Filed: Jan. 27, 2009

(65) Prior Publication Data

US 2009/0238204 A1 Sep. 24, 2009

Related U.S. Application Data

(60) Provisional application No. 61/032,049, filed on Feb. 27, 2008.

(51) Int. Cl.
*G06F 15/16* (2006.01)
*H04L 29/06* (2006.01)

(52) U.S. Cl.
CPC .............................. *H04L 29/06047* (2013.01)
USPC ........................... 370/466; 709/203; 709/219

(58) Field of Classification Search
USPC .................................. 370/466; 709/203, 219
See application file for complete search history.

(56) References Cited

U.S. PATENT DOCUMENTS

| | | | |
|---|---|---|---|
| 2003/0093568 A1* | 5/2003 | Deshpande | 709/247 |
| 2003/0191799 A1* | 10/2003 | Araujo et al. | 709/203 |
| 2005/0046637 A1 | 3/2005 | Mondal | |
| 2006/0206820 A1 | 9/2006 | Bullard et al. | |
| 2007/0016682 A1 | 1/2007 | Hodgson et al. | |
| 2007/0124474 A1 | 5/2007 | Margulis et al. | |

FOREIGN PATENT DOCUMENTS

WO WO-2009108363 A1 9/2009
WO WO-2009108363 A4 9/2009

OTHER PUBLICATIONS

"International Application Serial No. PCT/US2009/01278, International Search Report mailed Apr. 22, 2009", 4 gps.
"International Application Serial No. PCT/US2009/01278, International Written Opinion mailed Apr. 22, 2009", 6 pgs.

* cited by examiner

*Primary Examiner* — Jason Mattis
*Assistant Examiner* — Stephen J Clawson
(74) *Attorney, Agent, or Firm* — Schwegman Lundberg & Woessner, P.A.

(57) ABSTRACT

Techniques for use within computer systems that communicate with multiple different terminal systems using multiple different terminal protocols are disclosed. In one embodiment, a partial protocol converter module is installed in a computer server system to enable the computer server system to communicate with terminal systems that use terminal protocol other than the terminal protocol used natively by the computer server system. The partial protocol converter module directly accesses a screen buffer in the computer server system that is associated with the terminal systems that use terminal protocol other than the terminal protocol used natively by the computer server system. The partial protocol converter module detects updates to the screen buffer and encodes these display screen updates into a message using the native protocol used by the terminal system and then transmits that encoded message to the terminal system.

20 Claims, 8 Drawing Sheets

SYSTEM AND METHOD FOR OBTAINING CROSS COMPATIBILITY WITH A PLURALITY OF THIN-CLIENT PLATFORMS

CROSS REFERENCE TO RELATED APPLICATIONS

This application claims the benefit of U.S. Provisional Patent Application Ser. No. 61/032,049 filed Feb. 27, 2008 ("SYSTEM AND METHOD FOR OBTAINING CROSS COMPATIBILITY WITH A PLURALITY OF THIN-CLIENT PLATFORMS"), which application is incorporated herein by reference in its entirety.

TECHNICAL FIELD

The present invention relates to the field of thin-client systems and computer terminal systems. In particular, but not by way of limitation, the present invention discloses techniques for allowing thin-client systems to support multiple different terminal protocols or thin-client protocols.

BACKGROUND

Centralized computer systems with multiple computer terminals for accessing the centralized computer systems were once the dominant computer architecture. Mainframe computer systems were shared by multiple computer users in a manner wherein each individual computer user had access to a separate computer terminal system coupled to the mainframe computer system.

In the late 1970s and early 1980s, personal computer systems revolutionized the computing industry by allowing each individual user to have access to their own full computer system. Each computer user could run their own software applications on their own personal computer system and did not need to share any of the personal computer's resources with any other computer user.

Although personal computers have become the dominant form of computing, there has been a resurgence of the centralized computer system with multiple terminals form of computing. Terminal based computer systems can have reduced maintenance costs since the individual computer users cannot easily introduce computer viruses into the computer system or load in unauthorized software programs that may cause problems for the computer system. Furthermore, modern personal computer systems have become so powerful that their computing resources generally sit idle for the vast majority of the time such that valuable computing resources are being used very inefficiently.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to a thin-client system, the teachings can be used in other environments. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
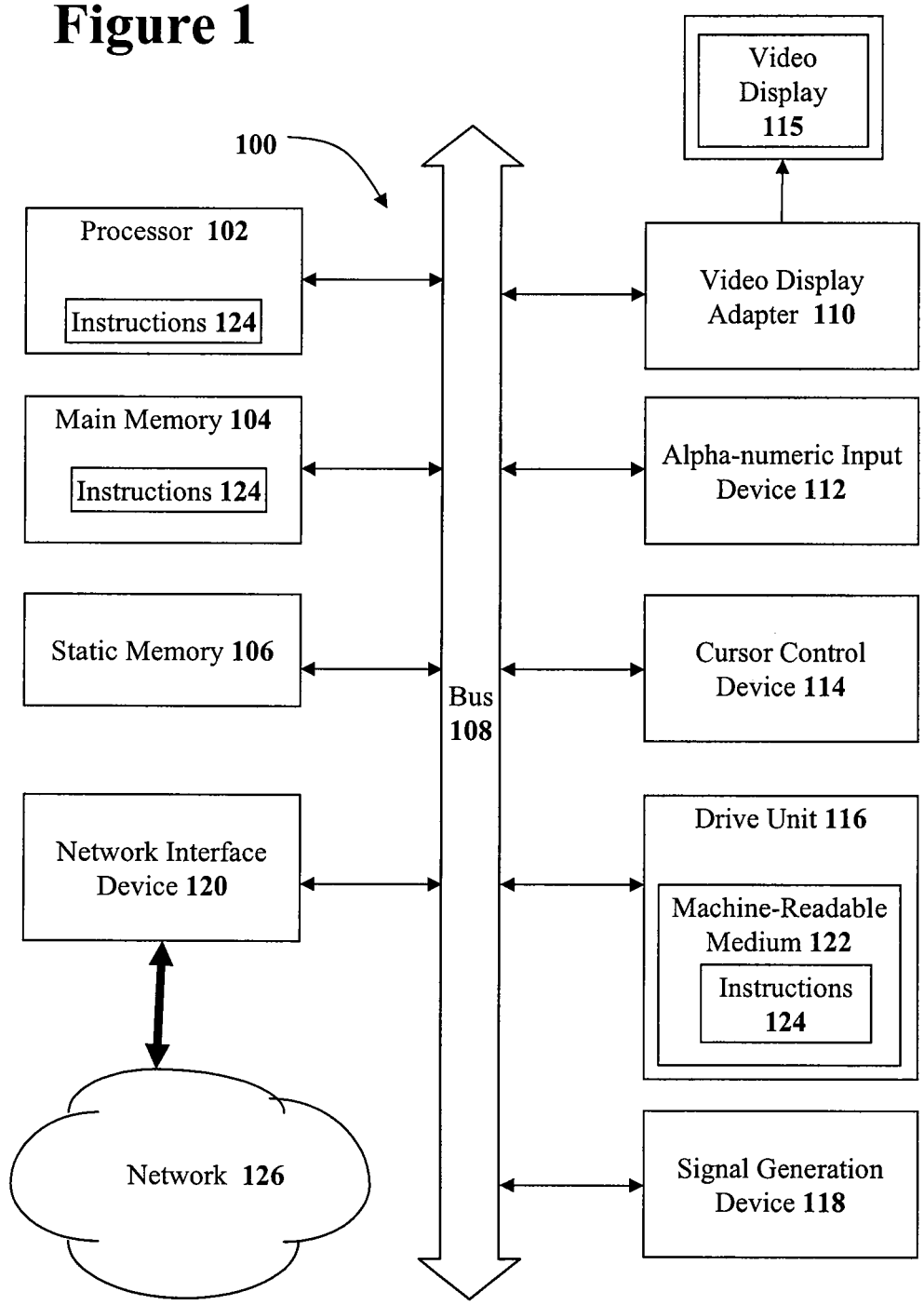
FIG. 1 illustrates a diagrammatic representation of machine in the example form of a computer system within which a set of instructions, for causing the machine to perform any one or more of the methodologies discussed herein, may be executed.

The present disclosure concerns computer systems. FIG. 1 illustrates a diagrammatic representation of machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a network 126 via the network interface device 120. Such transfers may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

The Resurgence of Terminal Systems

Before the advent of the inexpensive personal computer, the computing industry largely used mainframe or mini-computers that were coupled to many "dumb" terminals such that many user could share the same computer system. Such terminals are referred to as 'dumb' terminals since the computing ability resided within the mainframe or mini-computer system and the terminal system merely displayed an output and accepted alpha-numeric input. No user application software ran locally on the terminal system. Computer operators shared the mainframe computer system with multiple individual users that each used individual computer terminals coupled to the mainframe computer. These computer terminal systems generally had very limited graphic capabilities and were mostly visualizing only alpha-numeric characters on the display screen of the terminal.

With the introduction of inexpensive personal computer systems, the use of dumb computer terminals largely disappeared since personal computer systems were much more cost effective. If the services of a dumb terminal were required in order to interface with a legacy terminal based computer system, a personal computer could easily emulate the operations of a dumb computer terminal at a cost very similar to the cost of a dedicated dumb computer terminal.

During the personal computer revolution, personal computer systems introduced high resolution graphics to personal computer users. Such high-resolution graphics allowed for much more intuitive computer graphical user interfaces rather than the old text-only display of most computer terminals. For example, all current personal computer graphical user interfaces that use multiple different windows, icons, and pull-down menus are implemented using high resolution graphics. Furthermore, high-resolution graphics allowed for software applications that use digital photos, videos, and graphical images.

In recent years, a new generation of computer terminal systems have been introduced into the marketplace as people have rediscovered some of the advantages of the terminal based computer systems. For example, computer terminals allow for greater security and reduced maintenance costs since the users of computer terminals cannot introduce computer viruses by downloading or installing new software into the computer system. This new generation of computer terminal systems feature high-resolution graphics capabilities that personal computer users have become accustomed to.

Modern terminal-based computer systems allow multiple users at high-resolution terminals to share a single personal computer system and all of the software installed on that personal computer system. In this manner, a modern high-resolution terminal is capable of delivering the functionality of a personal computer system without the costs and the maintenance requirements of a personal computer system. One category of these modern terminal systems is called "thin client" systems. Although the techniques set forth this document will mainly be disclosed with reference to thin-client systems, the techniques described herein are applicable in other area of the information technology (IT) industry as well.

A Thin-Client System

Figure 2A:
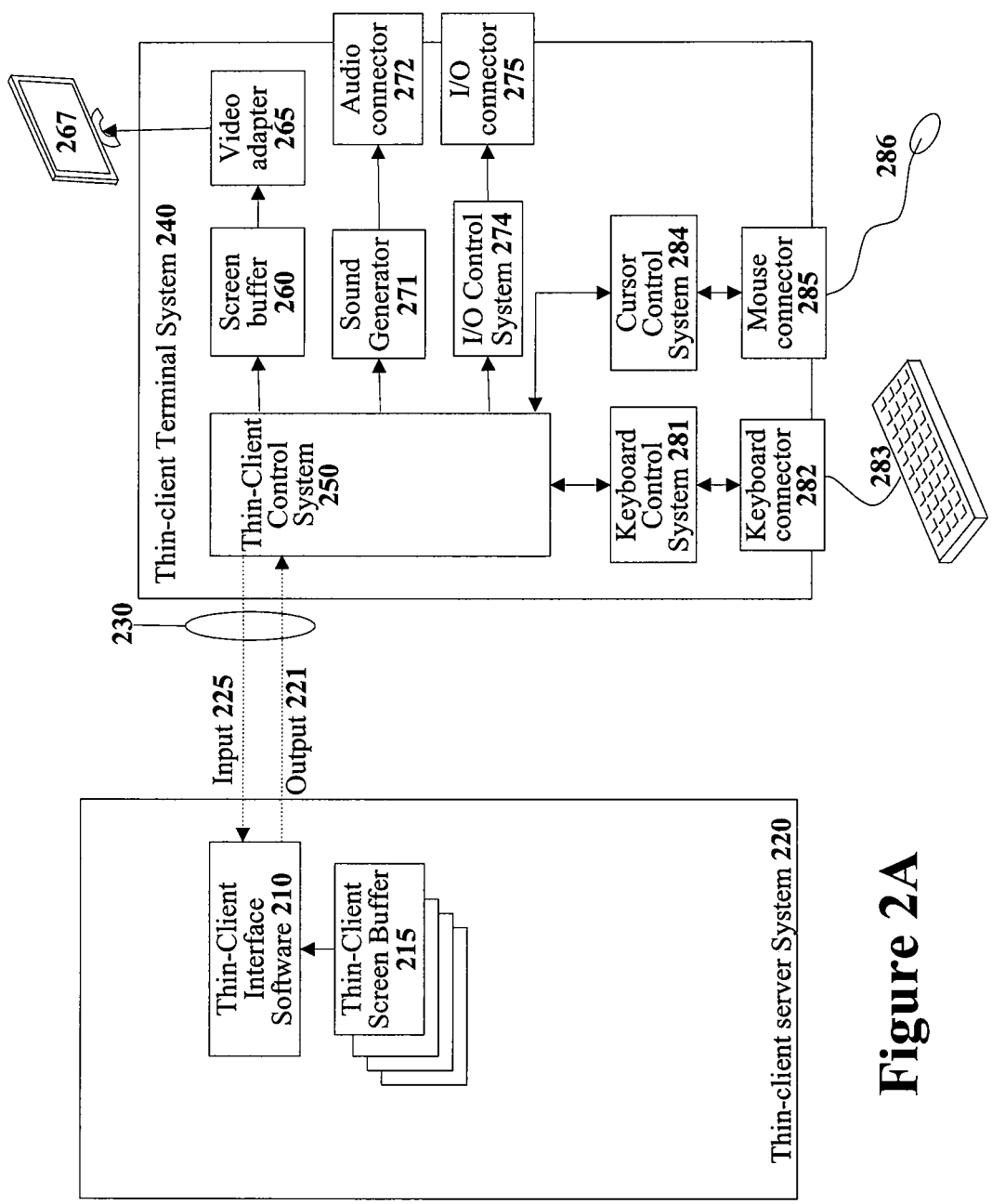
FIG. 2A illustrates a high-level block diagram of one embodiment of a thin-client terminal system coupled to a thin-client server computer system.

FIG. 2A illustrates a high-level block diagram of one embodiment of a thin-client terminal system 240 coupled to a thin-client server computer system 220 with a communications channel 230. Thin-client terminal system 240 provides terminal access to the computing resources of server computer system 220. The thin-client server computer system 220 may be a typical computer system such as the computer system 100 illustrated in FIG. 1. Since modern personal computer systems have become such powerful computer systems, thin-client server computer system 220 may be a standard modern personal computer system. The communications channel 230 may be any suitable bi-directional digital communication channel such as Ethernet, USB, etc.

Figure 3:
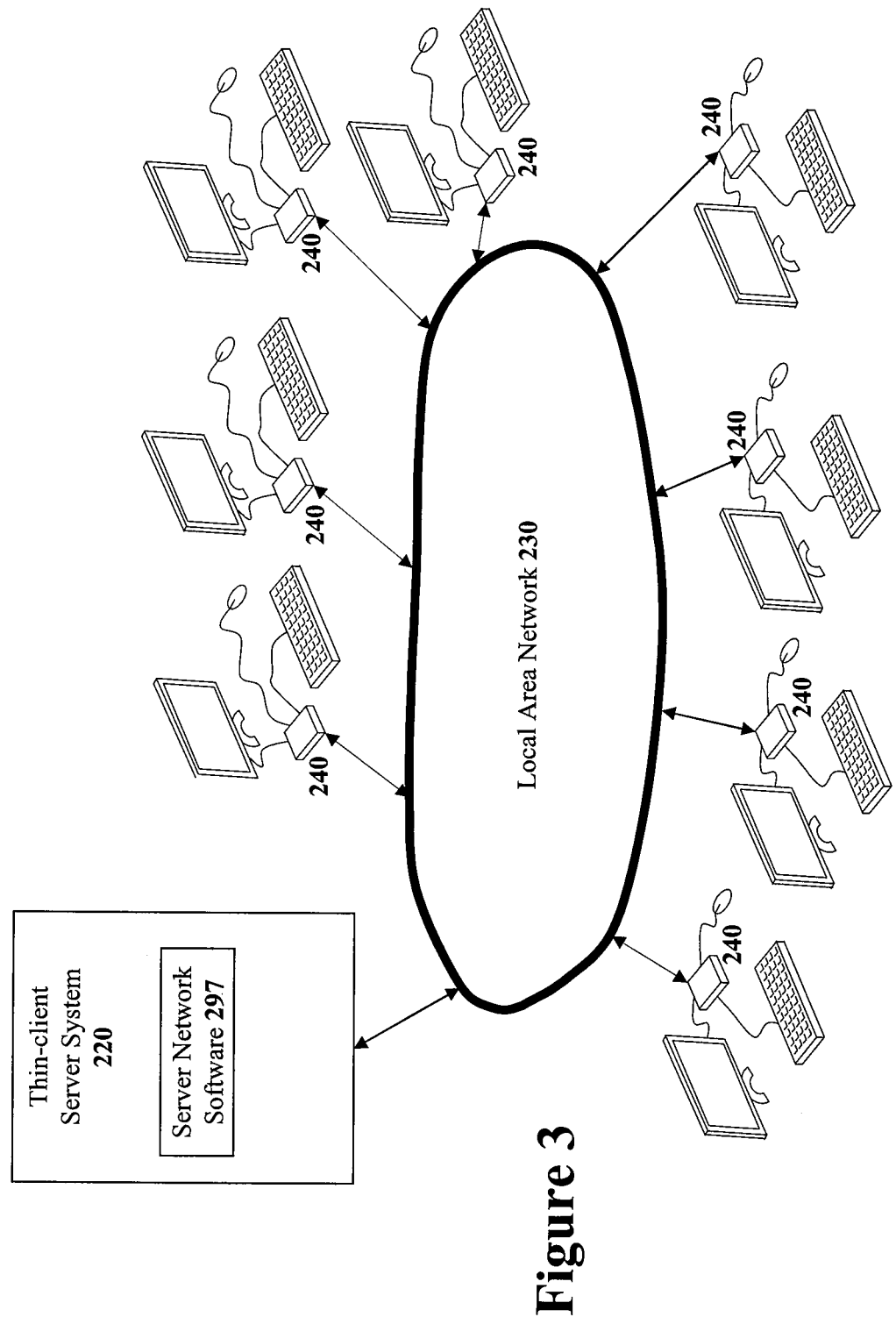
FIG. 3 illustrates several thin-client terminals coupled to a thin-client server system using a local area network.

FIG. 3 illustrates a conceptual diagram of one thin-client environment wherein a single thin-client server computer system 220 provides computer resources to many individual thin-client terminal systems 240. In the embodiment of FIG. 3, each of thin-client terminal systems 240 are coupled to the thin-client server computer system 220 using local area network 230 as a communication channel. For example, an Ethernet computer network may be used to couple the individual thin-client terminal systems 240 to the thin-client server computer system 220.

Referring back to FIG. 2A, the goal of thin-client terminal system 240 is to provide most or all of the standard input and output features of a typical personal computer system to the user of thin-client terminal system 240. However, this goal is to be done without providing the full computing resources or software of a personal computer system since those features will be provided by the thin-client server system 220 that will interact with the thin-client terminal system 240.

From an output perspective, one embodiment of the thin-client terminal system 240 provides both a high-resolution video display system and an audio output system. The high-resolution video display system consists of a screen buffer 260 that contains the contents of a bit-mapped display and a video adapter 265 that generates a video display signal to drive a display system 267 using the bit-mapped display information in screen buffer 260. The screen buffer 260 is filled with display information provided by thin-client control system 250 using video information sent as output 221 by the thin-client server system 220 across a communications channel 230. Similarly, the audio system consists of a sound generator 271 coupled to an audio connector 272 for creating a sound signal with information provided by thin-client control system 250 using audio information sent as output 221 by the thin-client server system 220 across a communications channel 230.

From an input perspective, thin-client terminal system 240 allows for both alpha-numeric input and cursor control input from a user using the thin-client terminal system 240. The alpha numeric input is provided by a keyboard 283 coupled to a keyboard connector 282 that supplies signals to a keyboard control system 281. Thin-client control system 250 encodes keyboard input from keyboard control system 281 and sends that keyboard input as input 225 to the thin-client server system 220. Similarly, the thin-client control system 250 encodes cursor control input from cursor control system 284 and sends that cursor control input as input 225 to the thin-client server system 220. With the high resolution display system, the sound generation system, the keyboard input system, and the cursor control input system; the thin client terminal system 240 provides the major input and output features typically used by a person using a personal computer system.

The thin-client terminal system 240 may include other input, output, or combined input/output systems in order to provide additional functionality to the user of the thin-client terminal system 240. For example, the thin-client terminal system 240 of FIG. 2A includes input/output control system 274 coupled to input/output connector 275. Input/output control system 274 may be a Universal Serial Bus (USB) controller and input/output connector 275 may be a USB connector in order to provide USB capabilities to the user of thin-client terminal system 240.

Thin-client server system 220 is equipped with software for interacting with multiple thin-client terminal systems. As illustrated in FIG. 2A, thin-client interface software 210 in thin-client server system 220 supports thin-client terminal system 240 as well as any other thin-client terminal systems coupled to thin-client server system 220. Each individual thin-client terminal system will have its own screen buffer in the thin-client server system 220 as illustrated by the multiple thin-client terminal screen buffers 215.

Multiple Different Thin-Client Systems

As the terminal-based model of computing experienced a resurgence of popularity, many different graphics terminal protocols have been introduced into the marketplace. The various graphics terminal protocols include the Remote Desktop Protocol (RDP) (by Microsoft of Redmond, Wash.), the Citrix MetaFrame ICA protocol (by Citrix Systems), the Virtual Network Computing protocol (VNC), the Sun Ray protocol (by Sun Microsystems, of Mountain View, Calif.), the X Terminal protocol used in various UNIX-based computer systems, the User eXtension Protocol (UXP) (by NComputing of Redwood City, Calif.), and a newly developing graphics terminal protocol known as Net2Display (A proposed VESA standard).

These different graphics terminal protocols are generally incompatible with each other. Thus, if an entity begins installing graphics terminals that use one of these graphics terminal protocols, then that entity may feel "locked in" to the vendor of the products for that particular graphics protocol. Otherwise, the entity may end up supporting multiple similar graphics terminal devices with incompatible graphics terminal protocols. Even if an information technology (IT) department is very diligent about only purchasing graphics terminals from one particular vendor, that IT department may end up having to support multiple different graphics terminal protocols due to a corporate acquisition of another entity that selected a different graphics terminal protocol as their preferred graphics terminal protocol.

Thin-Client Terminal System with Protocol Converter

Figure 2B:
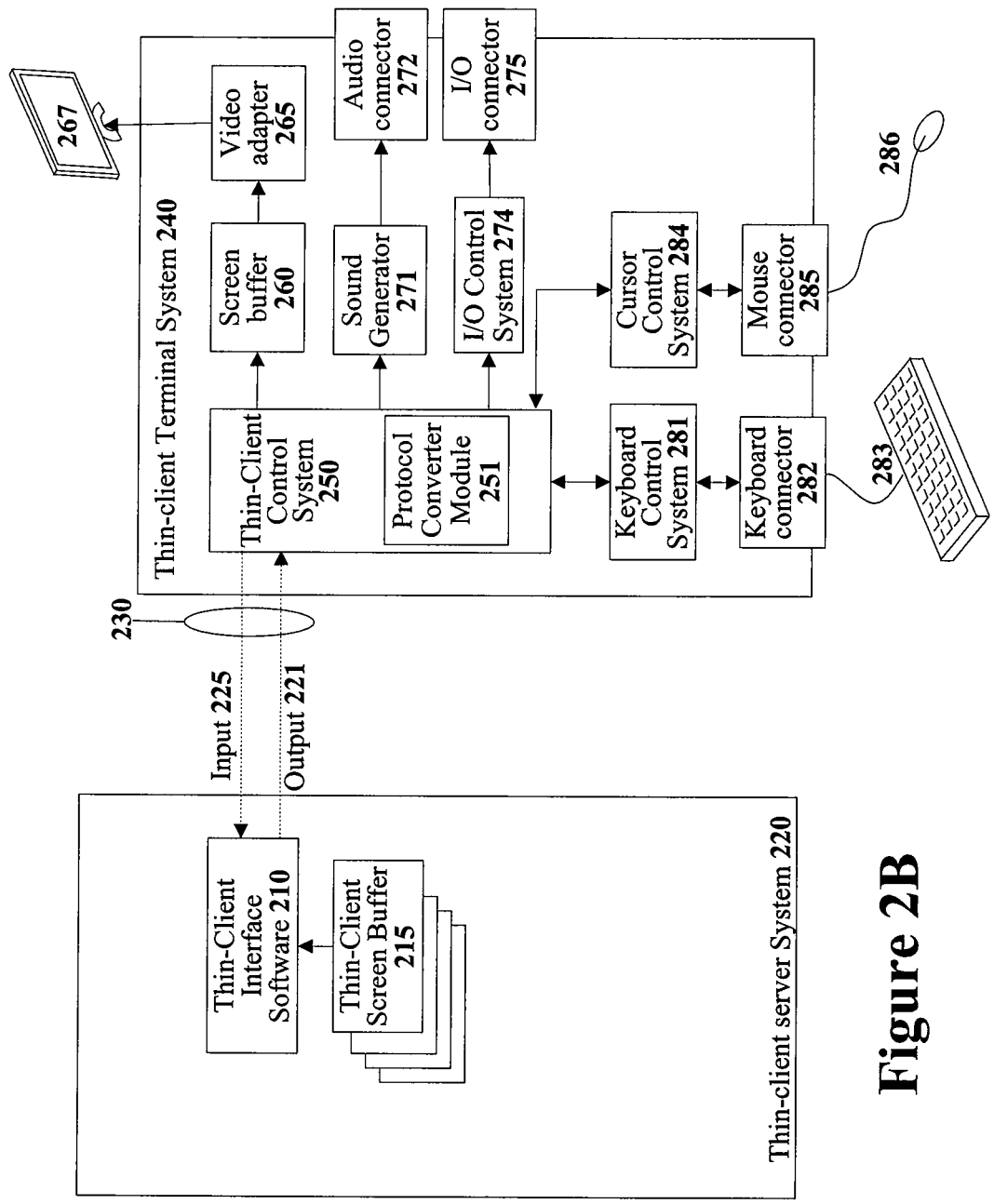
FIG. 2B illustrates the thin-client system of FIG. 2A wherein a protocol converter module has been added to a thin-client terminal system to allow it to communicate with a server system that uses a different terminal protocol.

One method of reducing this multiple graphics terminal protocol problem is to use thin-client terminal systems that include a protocol converter such that the thin-client terminal systems can handle multiple different graphics terminal protocols. FIG. 2B illustrates such an embodiment. FIG. 2B illustrates the thin-client terminal system 240 of FIG. 2A wherein a protocol converter module 251 is included within the thin-client control system 250 of the thin-client terminal system 240. The protocol converter module 251 would be responsible for handling multiple different graphics terminal protocols such that the thin-client terminal system 240 of FIG. 2B would be capable of operating in multiple different thin-client environments that use different graphics terminal protocols.

However, there are a number of problems associated with the proposed solution of a thin-client terminal based protocol converter 251 as illustrated in FIG. 2B. One of the primary problems with this approach is that embedding a protocol converter into a thin-client terminal system 240 is not practical on an economic basis. One of the goals of thin-client terminal systems is to reduce deployment costs on a per user basis. In order to achieve this goal, thin-client terminal systems are constructed as lean as possible in order to be able to manufacture the thin-client terminal systems for a very low cost. By introducing a protocol converter 251 into thin-client terminal system 240, the cost of that thin-client terminal system may increase greatly due to the costs of more memory, greater processing power, and license fees needed to implement other proprietary graphics terminal protocols. Another problem may be an increased deployment cost since each individual thin-client terminal system 240 may need to be individually configured by an administrator in order to specify which of multiple graphics terminal protocols that thin-client terminal system 240 should be using.

Thin-Client Server System with Protocol Converter

As set forth in the previous section, placing a protocol converter within the multiple individual thin-client terminal systems 240 is a not a practical method of handling the problem of multiple different graphics terminal protocols. So an alternative solution would be to put a protocol converter in the thin-client server system instead of in the individual thin-client terminal systems.

Figure 2C:
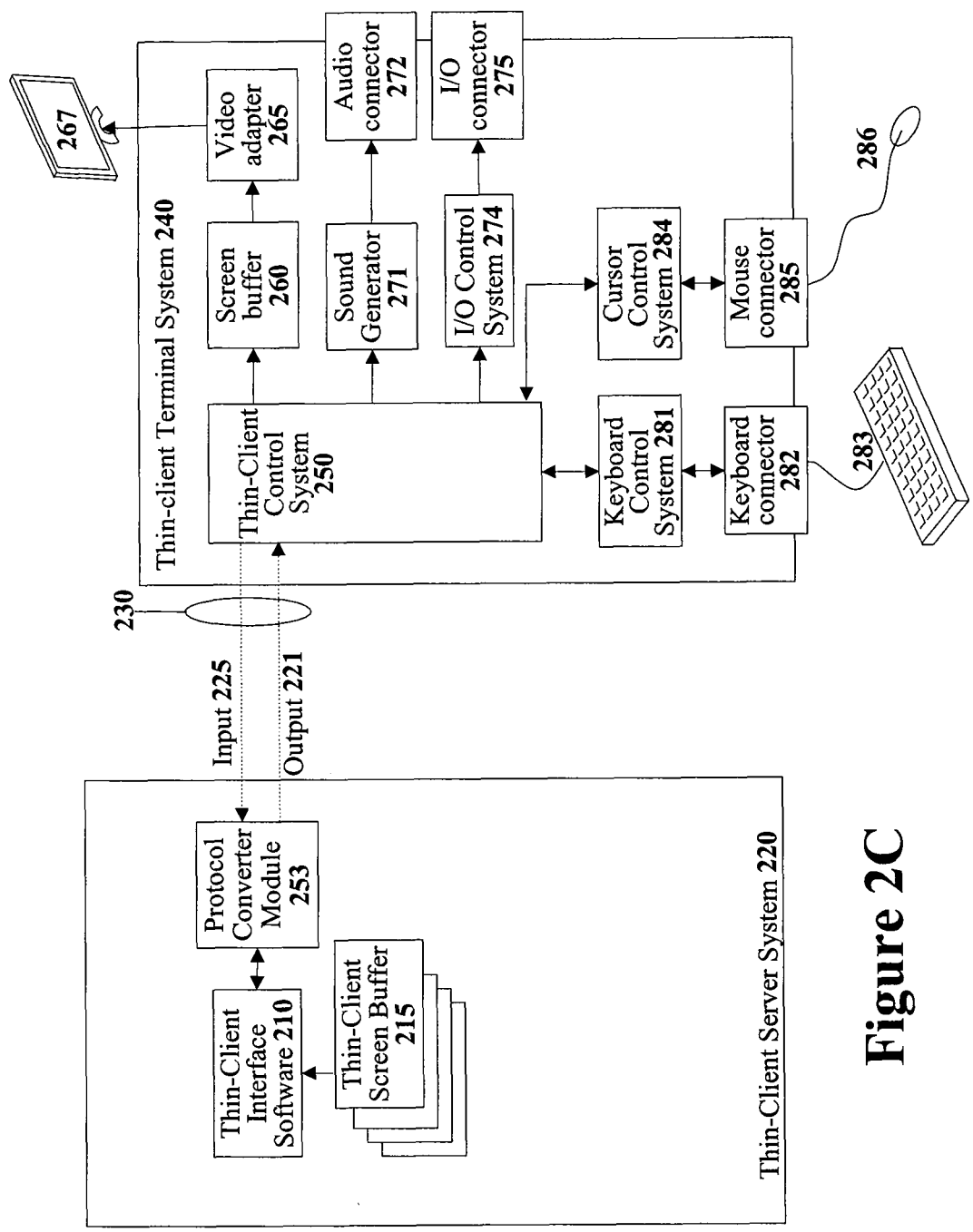
FIG. 2C illustrates the thin-client system of FIG. 2A wherein a protocol converter module has been added to the thin-client server system to allow it to communicate with thin-client terminal systems that use a different terminal protocol.

FIG. 2C illustrates the thin-client environment of FIG. 2A wherein a protocol converter module 253 has been added within the thin-client server system 220. The protocol converter 253 may allow communication to pass through unchanged when the thin-client interface software 210 in the thin-client server system 220 is communicating a thin-client terminal system that uses the same native graphics terminal protocol. However, when the thin-client interface software 210 attempts to communicate with a thin-client terminal system that uses a different type of graphics terminal protocol, the protocol converter module 253 will translate the communication from the thin-client interface software 210 into the specific graphics terminal protocol used natively by the thin-client terminal system before sending it as output 221. Similarly, when that thin-client terminal system that uses a different native graphics terminal protocol sends input 225 information (such as keystrokes from a keyboard or cursor control device movements) then protocol converter module 253 will translate that input information into the native graphics terminal protocol used by thin-client interface software 210 within the thin-client server system 220.

The solution to the multiple graphics terminal protocol problem illustrated in FIG. 2C is more economical than the proposed solution illustrated in FIG. 2B. For example, the only change this is required is the addition of single protocol converter module 253 into thin-client server system 220. Furthermore, the configuration for all the different thin-client terminal systems that will be used can be done at the thin-client server system 220 instead of at all the individual thin-client terminal systems.

However, there are still some issues associated with the solution to the multiple graphics terminal protocol problem illustrated in FIG. 2C. On problem is that protocol conversion is not a trivial task such that the performance of the entire thin-client terminal system may suffer. For each unit of communication (command, packet, request, response, or what ever the communication unit is for a particular graphics terminal protocol), the protocol converter module 253 must decode the graphics terminal protocol command, translate that graphics terminal command into the native graphics terminal protocol, and construct a new communication in the native graphics terminal protocol of the destination device along with reformatted data from the original graphics terminal command. With the large amount of data that passes between a thin-client server system and a thin-client terminal system, this protocol conversion task can consume a large amount of the processing power of the thin-client server system 220. This problem is further compounded with every additional non-native thin-client terminal system that is added to the thin-client environment since each non-native thin-client terminal system will require such protocol conversion.

In addition to the additional processing burden on the thin-client server system 220, the protocol converter module 253 introduces an additional delay time into the thin-client system. For example, when the thin-client server system 220 has an update for the screen display of a thin-client terminal system, that display update is first written to the thin-client terminal's associated screen buffer 215 in the thin-client server system 220. Next, that change to the thin-client terminal's screen buffer 215 in the thin-client server system 220 is encoded into a thin-client graphics protocol message in the graphics protocol native to the thin-client server system 220 by thin-client interface software 210. That thin-client graphics protocol message is then intercepted by protocol converter module 253 before it is sent out on communication channel 230. Protocol converter module 253 then must decode the thin-client graphics protocol screen display update message, translate the screen display update message, and then encode the screen display update into the native thin-client graphics protocol message used by the recipient thin-client terminal system 240. This significant amount of processing by the protocol converter module 253 of the screen display update message may delay the screen update on the thin-client terminal system 240 in a manner that is noticeable by a user of the thin-client terminal system 240.

Thin-Client Server System with a Partial Protocol Converter

To provide a better solution to the multiple graphics terminal protocol problem, the present disclosure introduces a partial protocol converter module that improves the performance of the system. The proposed partial protocol converter converts the protocol of some of the communication that occurs between a thin-client server system and a thin-client terminal system but other communication is handled both in the thin-client server system and the thin-client terminal system using the native graphics terminal protocol of the thin-client terminal system.

Referring back to the example thin-client environment illustrated in FIG. 2A, a thin-client server system 220 communicates bi-directionally with a thin-client terminal system 240 across a communications channel 230. Although the communication across communications channel 230 is bi-directional, the vast majority of that communication is output 221 from the thin-client server system 220 to the thin-client terminal system 240 with a much smaller amount of input 225 from the thin-client terminal system 240 to the thin-client server system 220. Specifically, the amount of high-resolution graphics display information transmitted from a thin-client screen buffer 215 in thin-client server system 220 to the thin-client terminal system 240 is significantly larger than the relatively small amount of user input information (keystrokes and cursor control device movements) from the thin-client terminal system 240 to the thin-client server system 220. Thus, if the amount of work that must be performed when sending high-resolution graphics display information from the thin-client server system 220 to the thin-client terminal system 240 could be reduced, a much more efficient thin-client environment would be realized.

All of the various different graphics terminal protocols handle the creation of high-resolution graphics display output 221 information in a similar manner. Specifically, all of the different graphics terminal protocols for thin-client terminal systems create a display screen buffer within the memory system of the thin-client server system 220 for each thin-client terminal systems coupled to the thin-client server system 220 as depicted by thin-client screen buffers 215. (Multiple different display screen buffers for the multiple different thin-client terminal systems are denoted by the stack of boxes.) These thin-client terminal screen buffers 215 are usually in the main memory of the thin-client server system 220 and each individual screen buffer contains a digital representation of the associated thin-client terminal's display screen. The same content available in thin-client terminal screen buffer 215 in the server system 220 becomes available in an associated thin-client terminal system's screen buffer 260 after a display screen update message is sent to the thin-client terminal system 240. Specifically, the thin-client interface software 210 encodes any changes detected in the server-based screen buffer 215 and then sends those changes to the associated thin-client terminal system 240 where the thin-client control system 250 decodes the changes and updates the local screen buffer 260 accordingly.

One embodiment of the present disclosure takes advantage of this commonality among the various different graphics terminal systems. Instead of performing laborious protocol conversions as set forth in the embodiment of FIG. 2C, one embodiment of the present disclosure directly monitors the thin-client screen buffer 215 in the in the server system 220 for each graphics terminal system that uses a non native graphics terminal protocol and directly generates display screen updates in the native graphics terminal protocol for the thin-client terminal system.

Figure 2D:
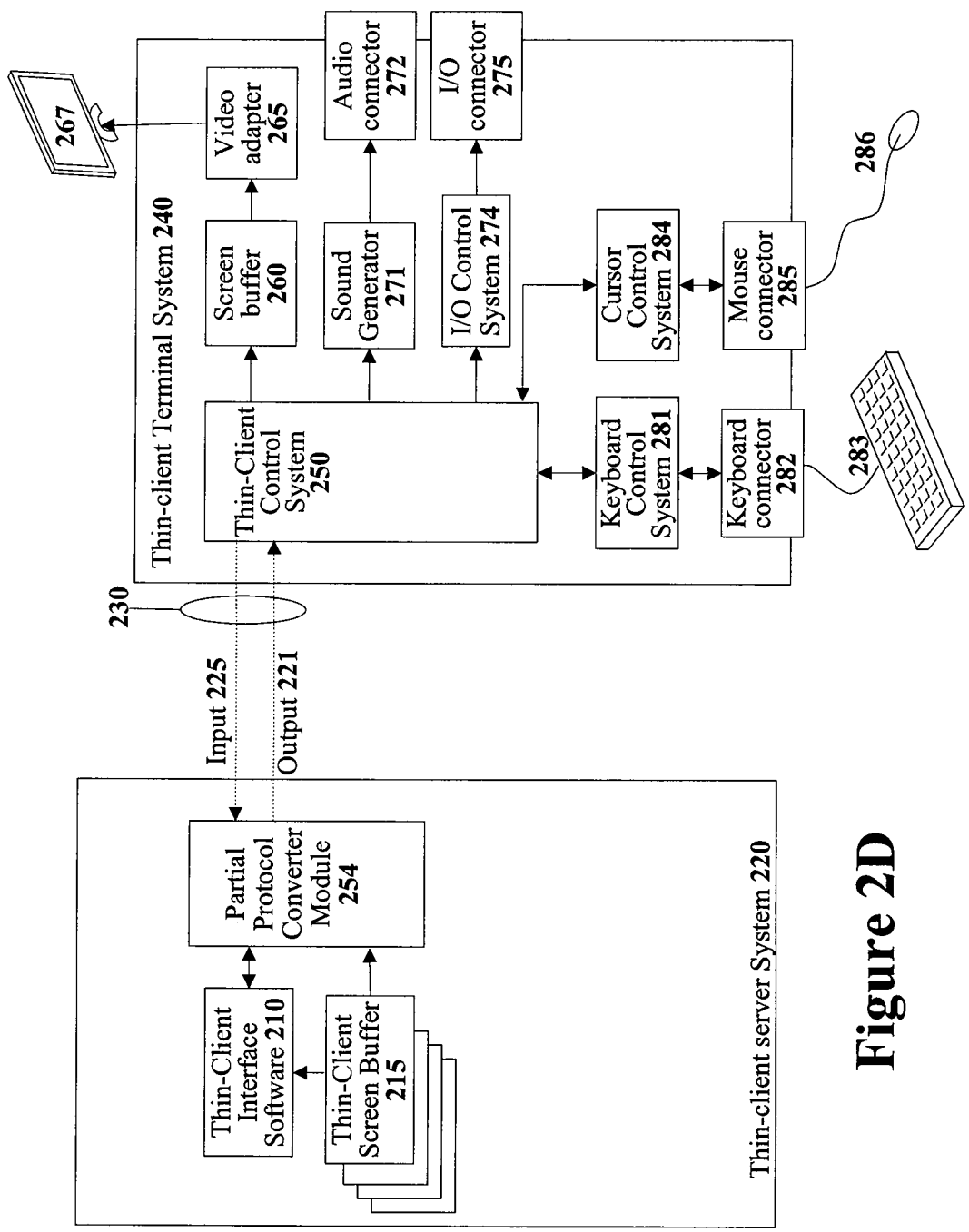
FIG. 2D illustrates the thin-client system of FIG. 2C wherein the protocol converter module has been replaced with a partial protocol converter module that communicated in a native protocol of the thin-client terminal system for display information.

FIG. 2D illustrates a block diagram of an embodiment of such a system. Referring to FIG. 2D, a partial protocol converter module 254 exists between thin-client interface software 210 in the thin-client server system 220 and all the thin-client terminal systems. When the thin-client interface software 210 in the thin-client server system 220 is communicating with a thin-client terminal system that uses the same native protocol (with input 225 or output 221), the partial protocol converter module 254 allows such communication to pass through unchanged. However, when the thin-client interface software 210 in the thin-client server system 220 is communicating with a thin-client terminal system that uses a different graphics terminal protocol, then partial protocol converter module 254 may perform some limited protocol conversion.

For example, in one embodiment, the partial protocol converter module 254 may receive input 225 (such as cursor control movements and keystrokes) from a thin-client terminal system 240 that does not use the same native protocol as and thin-client interface software 210 and thus translate such communication before passing it along to thin-client interface software 210. However, instead of receiving graphics screen updates from thin-client interface software 210 and translating such graphics screen updates, the partial protocol converter module 254 will instead read directly from the thin-client screen buffer 215 associated with that thin-client terminal system 240 and transmit updates to the thin-client screen buffer 215 using the native protocol of that thin-client terminal system 240. In one embodiment, the partial protocol converter module 254 continues to receive display update messages from thin-client interface software 210 in the native graphics protocol of the server but may simply discard such messages.

Any other output from the thin-client interface software 210 that does not concern the image on the display screen (as represented in the thin-client screen buffer 215) may be translated by partial protocol converter module 254 before being sent to the thin-client terminal system 240. By eliminating the computational task of performing protocol conversion on updates to the thin-client screen buffer 215, the partial protocol converter module 254 eliminates the vast majority of the protocol conversion work that must be performed by the full protocol converter module 253 in the embodiment disclosed in FIG. 2C.

Partial Protocol Converter with Operating System Redirection

Other means of avoiding graphics terminal protocol conversion work can be implemented instead or in addition to the partial protocol converter technique described with reference to FIG. 2D. In one alternate embodiment, various requests made to the thin-client interface software 210 from an application program associated with thin-client graphics terminal can be intercepted in order to prevent the need for performing graphics terminal protocol conversions associated with such requests.

Figure 2E:
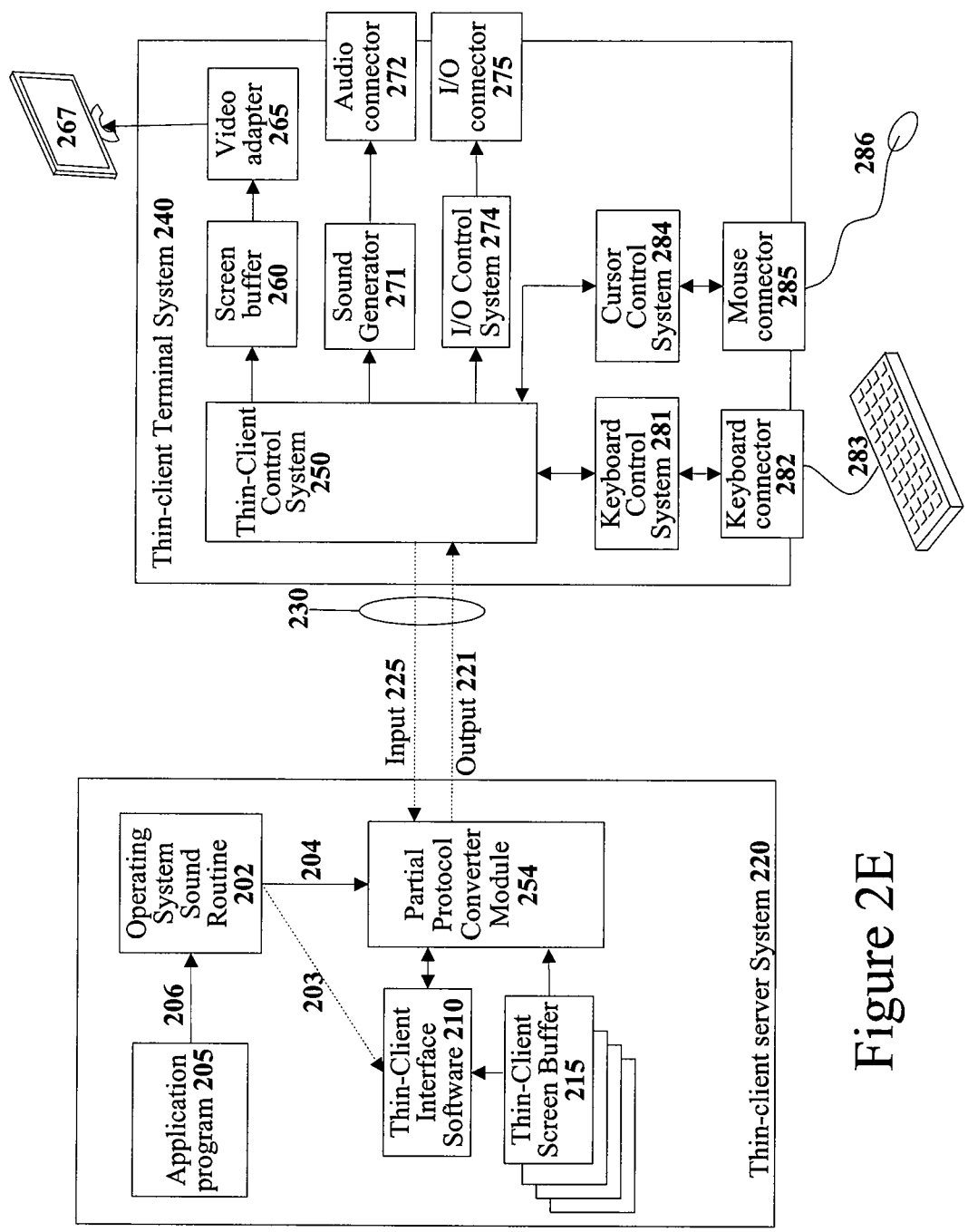
FIG. 2E illustrates the thin-client system of FIG. 2D wherein the partial protocol converter module is informed about some output calls to the operating system.

FIG. 2E illustrates another embodiment of a thin-client server system 220 with a partial protocol converter 254. When application program running on thin-client server system 220 needs to generate a sound, the application program may call an operating system sound routine 202 that would generally access the hardware resources of thin-client server system 220 in order to generate a sound. However, if the application program (such as application program 205) is being run on behalf of a user located on a remote thin-client terminal system 240 coupled to the thin-client server system 220 then the thin-client interface software 210 must have a method of detecting the request to generate a sound and a method of transmitting a similar request to generate a sound to the thin-client terminal system such that the user of the remote thin-client terminal system 240 will hear the sound.

One common method of achieving these objectives is to have thin-client interface software 210 instruct the operating system sound routine 202 to forward any requests from an application program that is associated with a user at a thin-client terminal system to thin-client interface software 210 along line 203. In this manner, the thin-client interface software 210 will be informed of any sounds created by application program 205 that is associated with a remote thin-client terminal system. In response, thin-client interface software 210 may send a corresponding sound request message to the associated thin-client terminal system in order to generate a sound at the thin-client terminal system.

If application program 205 is associated with a thin-client terminal system that does not use the native protocol of the thin-client interface software 210, then partial protocol converter 254 may instead instruct operating system sound routine 202 to forward any requests from application program 205 directly to partial protocol converter 254 along line 204. (Note that operating system sound routine 202 would then no longer forward the request along line 203.) By having the operating system sound routine 202 direct the request directly to partial protocol converter 254, it can immediately create and sent a sound request message to the thin client terminal system using that thin-client terminal's native protocol. Note that this same operating system request redirection technique can be used for any request made to an operating system that would result in some type of output that will need to be directed to a remote thin-client terminal system. Note that sound request calls associated with applications for users at graphics terminals that use the same native graphics terminal protocol as the thin-client server system 202 would continue to be directed to thin-client interface software 210.

Full Redirection Embodiment

As set forth in the previous section with reference to FIG. 2E, a partial protocol converter 254 may be used perform protocol conversion on some communications and intercept operating system requests with regard to other communication. Any mix of these two techniques (graphics terminal protocol conversion and operating system request intercept) may be used including an embodiment that uses operating system request intercepts for all communication with non-native thin-client terminal systems as illustrated in the embodiment disclosed by FIG. 2F.

Figure 2F:
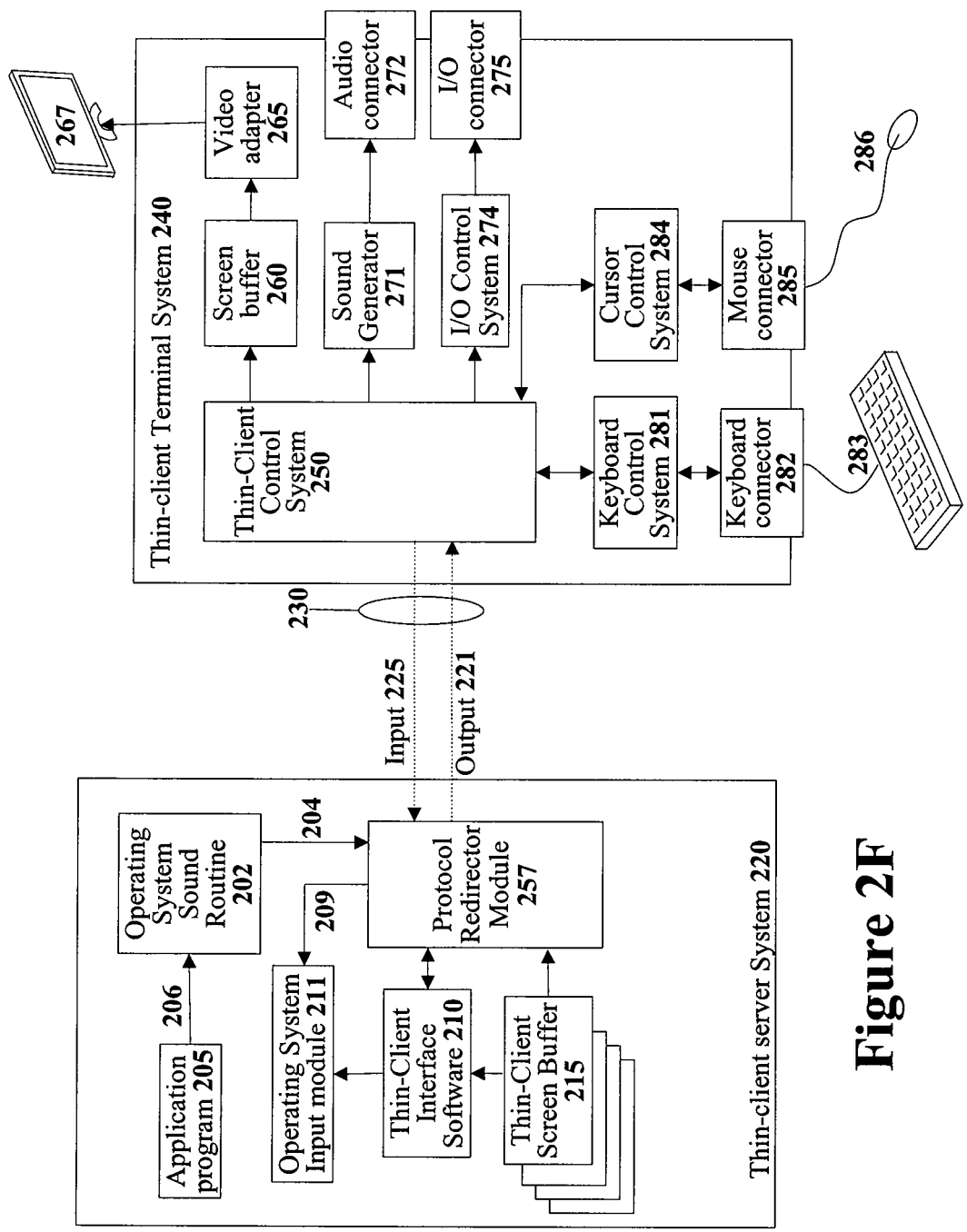
FIG. 2F illustrates the thin-client system of FIG. 2A wherein a protocol redirector module has been added to a thin-client server system.

In the embodiment of FIG. 2F, the thin-client interface software 210 will continue to operate normally and communicate with its associated thin-client terminal systems that use the same native graphics terminal protocol as thin-client interface software 210. However, the protocol redirector module 257 will handle all communication with associated thin-client terminal systems that use a different graphics terminal protocol by communicating with the operating system in thin-client server system 220. Note that protocol redirector module 257 does not have 'protocol conversion' in its name since no graphics terminal protocol conversion takes place in the embodiment of FIG. 2F.

To handle all output to thin-client terminal systems that do not use the native graphics terminal protocol of thin-client server system 202, the protocol redirector module 257 will either access output data directly or intercept requests to the operating system that generate output. For example, with regard to accessing output data directly, protocol redirector module 257 is illustrated directly accessing output data from a thin-client screen buffer 215. Protocol redirector 257 will then send display screen updates directly to the associated thin-client terminal system in its native graphics terminal protocol With regard to intercepting operating system calls, protocol redirector module 257 has instructed operating system sound routine 202 to be informed of any operating system requests from application programs that are associated with its associated thin-client terminal systems. Thus, when application program 205 makes a request 206 to operating system sound routine 202 to generate a sound, operating system sound routine 202 makes a corresponding request 204 into a sound generation routine in protocol redirector module 257. Protocol redirector module 257 will then generate and send the appropriate graphics terminal protocol messages to the associated thin-client terminal system in its native protocol in order to have that thin-client terminal system generate a sound that will be heard by the user of the thin-client terminal system.

Input from thin-client terminal systems that use a different graphics terminal protocol than the server system may be handled in a similar manner. Specifically, when a user types into a keyboard 283 or moves a cursor control device 286 associated with a thin-client terminal system 240 that is handled by protocol redirector module 257 then protocol redirector module 257 will receive such messages from that thin-client terminal system 240 as input 226. Protocol redirector module 257 will then decode these input messages and relay the input data directly to an appropriate operating system input module 211 while specifying which particular thin-client terminal system supplied the input data. The operating system input module 211 will supply the input data to application program 205 as needed.

As illustrate in the various different embodiments of FIGS. 2D, 2E, and 2F, the thin-client interface software 210 remains untouched. In this manner, the thin-client interface software 210 will continue to operate normally and communicate with its associated thin-client terminal systems in their native graphics terminal protocol. However, thin-client terminal systems that use other graphics terminal protocols will have all of their communication handled by partial protocol converter 254 or protocol redirector module 257 depending on the implementation. In order to reduce the amount of traffic on the communication channel 230, partial protocol converter 254 or protocol redirector module 257 will instruct thin-client interface software 210 as to what types of packets thin-client interface software 210 does not need to generate since the partial protocol converter 254 or protocol redirector module 257 will now handle some of the communication with thin-client terminal systems. For example, the thin-client interface software 210 does not need to generate display update messages for non native thin-client terminal systems if the partial protocol converter 254 or the protocol redirector module 257 will be directly reading out of the thin-client screen buffers 215 and directly sending display update messages to those thin-client terminal systems in the native graphics terminal protocol.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A method of communicating with a terminal system, said method comprising:
   locating a terminal screen buffer within a server system, said terminal screen buffer created for said terminal system that does not use a first graphics terminal protocol used natively by said server system, said terminal screen buffer storing a digital representation of a display screen of said terminal system;
   receiving, at the server system, data to be transmitted to said terminal system;
   based on first data that is a graphical update to said digital display screen representation of said terminal screen buffer:
      reading said graphical update stored in said terminal screen buffer; and
      transmitting said graphical update to said terminal system in a display update message using a second graphics terminal protocol natively supported by said terminal system without converting said graphical update from said first graphics terminal protocol to said second graphics terminal protocol; and
   based on second data that is not said graphical update to said terminal screen buffer:
      translating said second data for said terminal system from said first graphics terminal protocol used natively by said server system to said second graphics terminal protocol used natively by said terminal system; and
      transmitting said translated second data to said terminal system.

2. The method of communicating with said terminal system as set forth in claim 1, said method comprising:
receiving messages for said terminal system in said first graphics terminal protocol used natively by said server system;
translating said messages for said terminal system from said first graphics terminal protocol used natively by said server system to said second graphics terminal protocol used natively by said terminal system; and
transmitting said messages in said second graphics terminal protocol to said terminal system.

3. The method of communicating with said terminal system as set forth in claim 1, said method comprising:
receiving messages from said terminal system, said messages encoded in said second graphics terminal protocol used natively by said terminal system;
translating said messages from said terminal system from said second graphics terminal protocol used natively by said terminal system to said first graphics terminal protocol used natively by said server system; and
passing said messages in said first graphics terminal protocol to terminal interface software in said server system.

4. The method of communicating with said terminal system as set forth in claim 1, said method further comprising:
intercepting requests to an operating system for generating output from application programs associated with said terminal system;
generating corresponding output request messages encoded in said second graphics terminal protocol used natively by said terminal system; and
transmitting said corresponding output messages to said terminal system in a native protocol for said terminal system.

5. The method of communicating with said terminal system as set forth in claim 1, said method further comprising:
receiving messages from said terminal system, said messages encoded in said second graphics terminal protocol used natively by said terminal system;
decoding said messages from said terminal system to determine input data; and
passing said input data to an operating system input module in said server system.

6. The method of communicating with said terminal system as set forth in claim 1, said method further comprising:
receiving display update messages encoded in said first graphics terminal protocol used natively by said server system addressed for said terminal system; and
discarding said display update messages encoded in said first graphics terminal protocol used natively by said server system.

7. The method of communicating with said terminal system as set forth in claim 4 wherein said output comprises a sound.

8. The method of communicating with said terminal system as set forth in claim 5 wherein said input data comprises keystrokes.

9. A computer system for communicating with a terminal system that does not use a first graphics terminal protocol native to said computer system, said computer system comprising:
a terminal screen buffer associated with said terminal system, said terminal screen buffer storing a digital representation of a display screen of said terminal system; and
a terminal communication module, said terminal communication module receiving data to be transmitted to said terminal system, said terminal communication module configured to:
based on first data that is a graphical update to said terminal screen buffer:
read said graphical update stored in said terminal screen buffer; and
transmit said graphical update to said terminal system in a display update message using a second graphics terminal protocol natively supported by said terminal system without converting said graphical update from said first graphics terminal protocol to said second graphics terminal protocol; and
based on second data that is not said graphical update to said terminal screen buffer:
translating said second data for said terminal system from said first graphics terminal protocol used natively by said server system to said second graphics terminal protocol used natively by said terminal system; and
transmitting said translated second data to said terminal system.

10. The computer system for communicating with said terminal system as set forth in claim 9 wherein said terminal communication module further receives messages for said terminal system in said first graphics terminal protocol used natively by said server system, translates said messages for said terminal system from said first graphics terminal protocol to said second graphics terminal protocol used natively by said terminal system, and transmitting said messages to said terminal system.

11. The computer system for communicating with said terminal system as set forth in claim 9 wherein said terminal communication module further receives receiving messages from said terminal system encoded in said second graphics terminal protocol used natively by said terminal system, translates said messages from said second graphics terminal protocol to said first graphics terminal protocol used natively by said server system, and passes said messages in said first graphics terminal protocol to terminal interface software in said server system.

12. The computer system for communicating with said terminal system as set forth in claim 9 wherein said terminal communication module further intercepts requests for generating output from application programs associated with said terminal system, generates corresponding output request messages encoded in said second graphics terminal protocol used natively by said terminal system, and transmits said corresponding output messages to said terminal system.

13. The computer system for communicating with said terminal system as set forth in claim 9 wherein said terminal communication module further receives messages encoded in said second graphics terminal protocol used natively by said terminal system from said terminal system, decodes said messages from said terminal system to determine input data, and passes said input data to an operating system input module in said server system.

14. The computer system for communicating with said terminal system as set forth in claim 9 wherein said terminal communication module further receives display update messages encoded in said first graphics terminal protocol used natively by said server system addressed for said terminal system and discards said display update messages encoded in said first graphics terminal protocol used natively by said server system.

15. A non-transitory machine-readable medium, said machine-readable medium comprising a set of instructions that, when executed by a processor, cause the processor to perform operations comprising:

locating a terminal screen buffer within a server system, said terminal screen buffer created for said terminal system that does not use a first graphics terminal protocol used natively by said server system, said terminal screen buffer storing a digital representation of a display screen of said terminal system;

receiving data for said terminal system in said first graphics terminal protocol used natively by said server system;

based on first data that is a graphical update to said terminal screen buffer:

reading said graphical update stored in said terminal screen buffer; and transmitting said graphical update to said terminal system in a display update message using a second graphics terminal protocol natively supported by said terminal system without converting said graphical update from said first graphics terminal protocol to said second graphics terminal protocol; and based on second data that is not said graphical update to said terminal screen buffer:

translating said second data from said first graphics terminal protocol used natively by said server system to said second graphics terminal protocol used natively by said terminal system; and transmitting said translated second data to said terminal system.

16. The non-transitory machine-readable medium as set forth in claim 15 wherein said operations implemented by said instructions further comprise:

receiving messages for said terminal system in said first graphics terminal protocol used natively by said server system;

translating said messages for said terminal system from said first graphics terminal protocol used natively by said server system to said second graphics terminal protocol used natively by said terminal system; and transmitting said messages in said second graphics terminal protocol to said terminal system.

17. The non-transitory machine-readable medium as set forth in claim 15 wherein said operations implemented by said instructions further comprise:

receiving messages from said terminal system, said messages encoded in said second graphics terminal protocol used natively by said terminal system;

translating said messages from said terminal system from said second graphics terminal protocol used natively by said terminal system to said first graphics terminal protocol used natively by said server system; and passing said messages in said first graphics terminal protocol to terminal interface software in said server system.

18. The non-transitory machine-readable medium as set forth in claim 15 wherein said operations implemented by said instructions further comprise:

intercepting requests to an operating system for generating output from application programs associated with said terminal system;

generating corresponding output request messages encoded in said second graphics terminal protocol used natively by said terminal system; and transmitting said corresponding output messages to said terminal system in a native protocol for said terminal system.

19. The non-transitory machine-readable medium as set forth in claim 15 wherein said operations implemented by said instructions further comprise:

receiving messages from said terminal system, said messages encoded in said second graphics terminal protocol used natively by said terminal system;

decoding said messages from said terminal system to determine input data; and passing said input data to an operating system input module in said server system.

20. The non-transitory machine-readable medium as set forth in claim 15 wherein said operations implemented by said instructions further comprise:

receiving display update messages encoded in said first graphics terminal protocol used natively by said server system addressed for said terminal system; and discarding said display update messages encoded in said first graphics terminal protocol used natively by said server system.

* * * * *